Sept. 17, 1963   R. W. TACCONE   3,103,717
MOLDING MACHINE WITH TWO SHUTTLING PATTERN PLATES
Filed Nov. 2, 1961   3 Sheets-Sheet 1

INVENTOR
RUSSELL W. TACCONE
BY
Charles L. Lovercheck
attorney

INVENTOR
RUSSELL W. TACCONE
BY
Charles L. Lovercheck
attorney

Sept. 17, 1963    R. W. TACCONE    3,103,717
MOLDING MACHINE WITH TWO SHUTTLING PATTERN PLATES
Filed Nov. 2, 1961    3 Sheets-Sheet 3

INVENTOR
RUSSELL W. TACCONE
BY
Charles L. Lorrenbach
attorney

United States Patent Office 3,103,717
Patented Sept. 17, 1963

---

3,103,717
MOLDING MACHINE WITH TWO SHUTTLING PATTERN PLATES
Russell W. Taccone, Erie, Pa., assignor to Taccone Corporation, North East, Pa., a corporation of Pennsylvania
Filed Nov. 2, 1961, Ser. No. 149,781
9 Claims. (Cl. 22—20)

This invention relates to molding machines and, more particularly, to machines for making green sand molds.

A mold as used in green sand casting is usually made up of a cope and a drag. The cope may have one-half of a pattern therein and the drag may have a cavity made by a complementary other half of the pattern. This ordinarily necessitates the use of two pattern plates, one having the cope half of the pattern thereon and the other having the drag half. This either requires the use of two separate molding machines or, during production, the operator is required to alternate, first making the cope half and then making the drag half of the mold.

The present invention contemplates a machine whereon both a cope half and a drag half of a pattern plate may be supported on the machine and flasks brought to the machine on a conveyor. The cope can, for example, be formed on the upper position and the drag on the lower. The cope and drag can be put together to form completed molds.

When molding parts which require inserts, cores, or chaplets to be set in the pattern, the machine described herein is especially useful since the operator can set the inserts in one pattern while the machine is molding the other, thus saving time. Where patterns are changed frequently as in a job shop, the operator can be changing one pattern while the machine is molding the other. The carrier can be made to support a pattern insert and this insert could be raised by the table. Thus, many patterns could be made to fit a single carrier.

One flask with a pattern can be shuttled into the machine at the same time the other with a completed mold therein is being shuttled out. Thus, no time need be added to the cycle. Also, the pattern is moved down from the mold. This is called a "drop away strip" and, in many cases, is better than lifting the pattern to strip it.

In the present machine, sand spillage is reduced because the distance to which the sand falls has been minimized. Further, it is not necessary to fill the upset full. Heavy patterns are readily accessible to lifting by a crane or other suitable means of transfer because of the arrangement of the machine.

The machine is also unique because it uses the same cycle and mechanism for both stripping and squeezing. This eliminates one cylinder ordinarily used for this single purpose and thereby simplifies the machine over prior machines of this type.

It is, accordingly, an object of the present invention to provide an improved molding machine.

Another object of the invention is to provide a molding machine having two separate pattern plate supports thereon which can be moved into position to form alternate halves of molds as they come down a conveyor line.

Another object of the invention is to provide a molding machine with means to selectively move a first or a second pattern into molding position while another pattern is having a mold formed thereon.

Still another object of the invention is to provide, in combination with a molding machine, pattern plate support tracks, one set for each pattern plate and its pattern.

Yet another object of the invention is to provide a machine as aforesaid wherein the pattern plate support tracks are spaced vertically and generally parallel and extend outside the molding machine.

A further object of the invention is to provide a molding machine which is simple in construction, economical to manufacture, and simple and efficient to use.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

Now with more specific reference to the drawings, a molding machine 10 is shown having a rigid frame which is relatively high. The machine has a gap 11 formed between the top and bottom thereof in which the molding operation is carried out. A convenient support 12 is provided in front of the machine 10 which supports the outward extension of the track and on which the pattern plates rest between molding operation. Here they are readily accessible to an operator and may be easily removed by suitable means for transfer.

Figure 1:
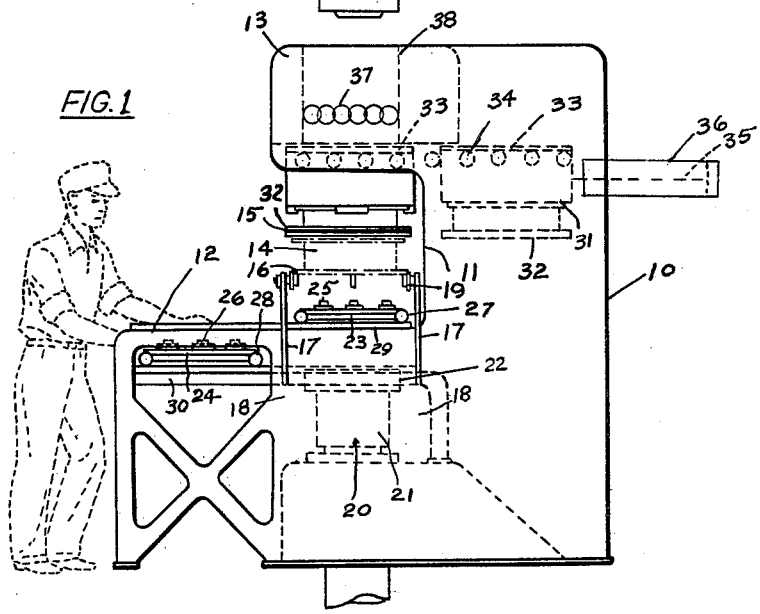
FIG. 1 is a side view of a machine according to the invention with one flask in molding position and the pattern plate stripped from the mold.
Figure 2:
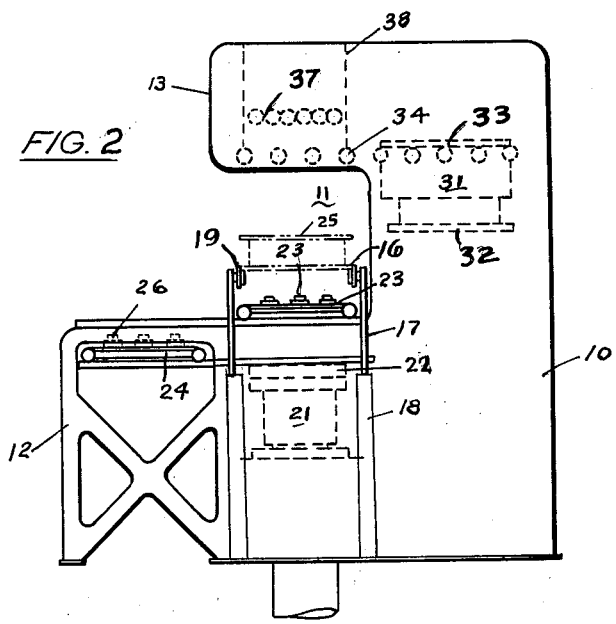
FIG. 2 shows the molding machine with the flask in position over the pattern plate.

Overhanging portion 13 of the machine supports a suitable sand dispensing chute 38 having a riddling mechanism 37 therein (FIGS. 1 and 2). This riddling mechanism may be elongated rollers having intermeshing pins thereon, such as disclosed in Patent No. 2,988,789, which pulverize any lumps of sand which may fall therethrough. This riddling mechanism could be loose chains or some other drive extending from one side to the other of the head.

A flask 14 may be one of a production line of flasks which can be rolled down a roller conveyor which is in alignment with rollers 19. The flask 14 has a top flange 15 which engages a lower flange 32 on the diaphragm head and a bottom flange 16 which extends outwardly from the peripheral edges of the flask and rests on the rollers 19 which are supported on piston rods 17 of cylinders 18. Cylinders 21 of a ram 20 may be connected to a suitable hydraulic or air circuit having control valves either manually or automatically operated to lift a top pattern plate 23 with the flask into the position shown in FIG. 3 or to lift a bottom plate 24 and to lower the pattern plates when they are stripped from the mold when the flask 14 returns to the rollers 19.

The ram 20 is made up of the cylinder 21 having a piston 22 therein. The cylinder 21 is fixed to the machine frame and it can be raised by a suitable hydraulic fluid or compressed air to lift either the pattern plate 24 or the pattern plate 23 into molding engagement with the lower side of the flask. The pattern plates 23 and 24 have patterns 25 and 26, respectively, thereon and the pattern plates are supported on carriers which have rollers 27 and 28, respectively, thereon which rest on an upper pattern plate track 29 and a lower pattern plate track 30, respectively.

A head 31 is generally of the type shown in Patent No. 2,588,669; however, it could have another type of means therein to compress the sand. The head has the peripheral outwardly directed flange 32 which is adapted to be engaged by the top flange 15 of the flask 14. The outwardly directed upper flange 33 forms a rim on the head 31 and rests on rollers 34. It may thus be transported into position over the pattern plates or out to the position shown in FIG. 3.

Figure 4:
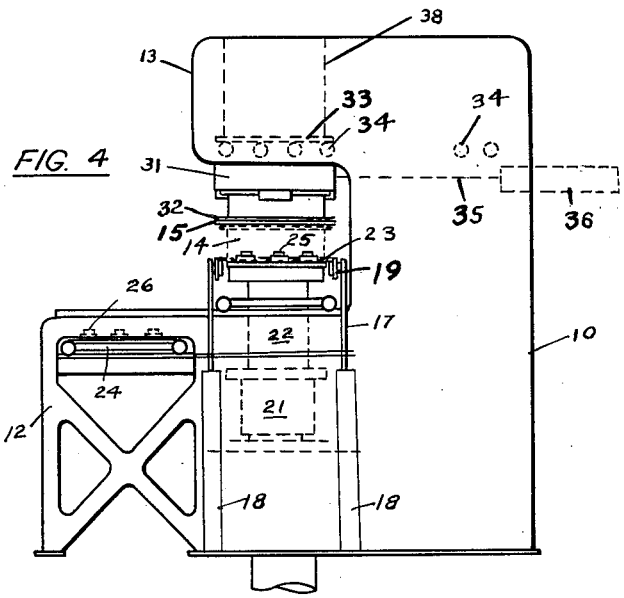
FIG. 4 shows the molding head in position with the flask and upper pattern plate raised into molding position with the head.

A piston rod 35 attached to a piston and cylinder 36 which is fixed to the machine frame is used to move the head to the position shown in FIG. 1 over the rollers 34 and to position it over the pattern plate as shown in FIG. 4.

FIG. 1 shows the machine with the head 31 moved into molding position and shown in dotted lines as retracted. It shows the upper pattern plate stripped from the mold and the ram in its unactuated position. The flask and mold rest on the roller track comprising the rollers 19 and are ready to be rolled down the track to be discharged and another flask brought into position.

FIG. 2 shows the machine with the head 31 back out of molding position, an empty flask in position on the track comprising the rollers 19, the ram in retracted position, the top pattern carrier in cycling position under the flask ready to be lifted, and the bottom carrier in loading position where an operator can fit chaplets, set cores, or change patterns while a mold is being formed on the top pattern.

Figure 3:
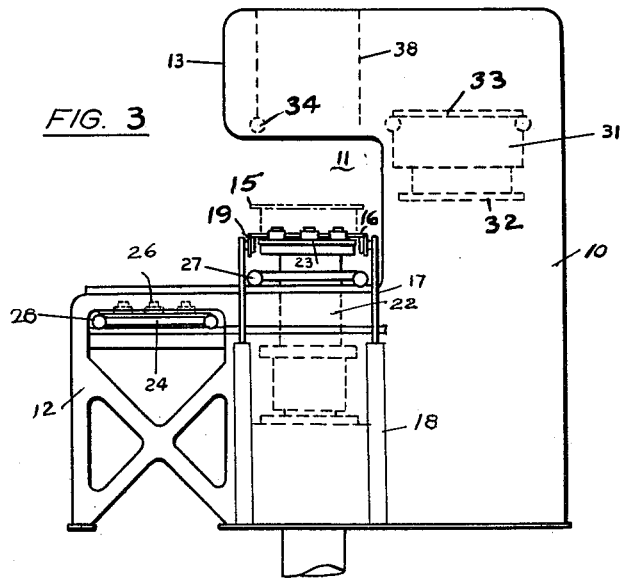
FIG. 3 shows the flask closed by the pattern plate and in position for filling.

FIG. 3 shows the head back, the ram in extended position, the top pattern raised out of its carrier to close the bottom of the flask, and the flask still resting on the track in seated position on the pattern ready to be filled.

FIG. 4 shows the head moved forward by the piston rod 35, the ram in extended position having lifted the flask 14 with its pattern, closing its bottom into engagement with the mold head ready for molding. In this position, the flask is raised from its roller wheels and the flask may be filled with sand from the dispensing means. Then the molding operation may take place.

Figure 5:
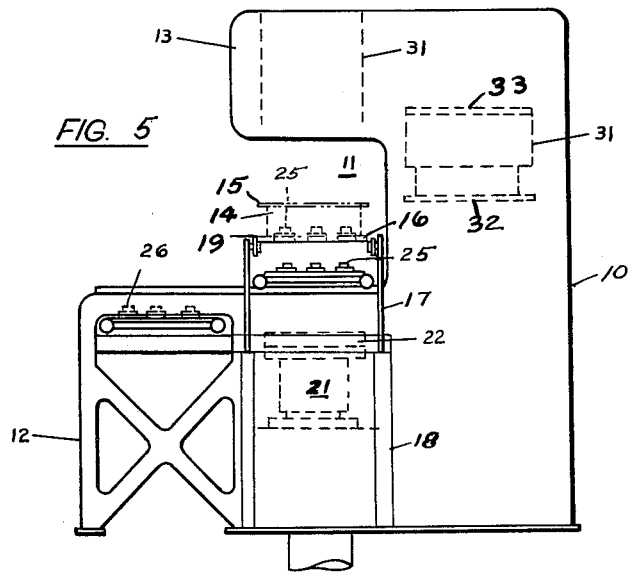
FIG. 5 shows the upper pattern plate stripped from the mold and the molding head in retracted position.

In FIG. 5, the mold has been formed. The head is shown back, the ram is in retracted position, the completed mold has returned to the roller wheels, and the pattern is drawn and seated on the pattern carrier ready to be moved or ready for another cycle.

Figure 6:
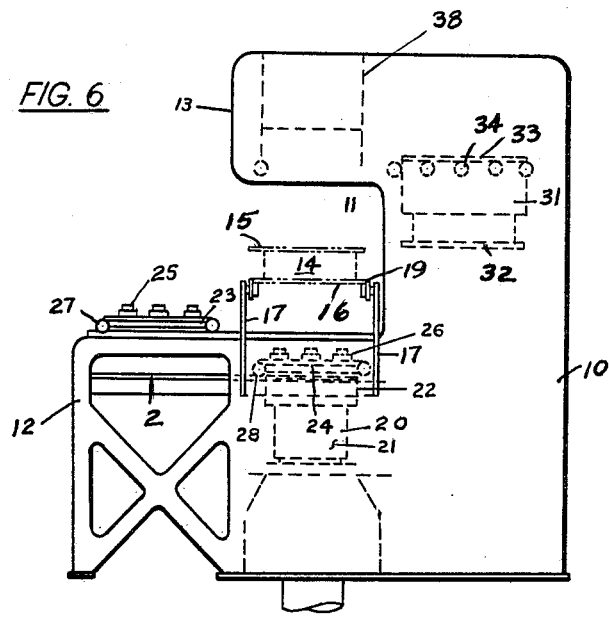
FIG. 6 shows the lower pattern plate in position to be raised into engagement with a flask for the next operation.

In FIG. 6, the top pattern carrier is shown out of cycling position and the bottom pattern carrier is in cycling position. The completed mold is out of cycling position, the empty flask is in cycling position, and the machine is ready to repeat its cycle.

The foregoing specification sets forth the invention in its preferred practical forms but the structure shown is capable of modification within a range of equivalents without departing from the invention which is to be understood as broadly novel as is commensurate with the appended claims.

The embodiments of the invention in which an exclusive property or privilege is claimed are defined as follows:

1. A molding machine comprising a machine frame, means to support a first pattern and means to support a second pattern on said machine, said first and second pattern support means being horizontally disposed and spaced one above the other, a flask support means on said machine, means to selectively move said patterns into molding relation with a flask on said flask support means, means on said machine to fill said flask with sand with either said pattern supported in molding relation thereto, a molding head, and means to move said head and said flask with either of said patterns therein relative to each other to bring said flask, pattern, and head into position to compress sand in said flask around said pattern.

2. The machine recited in claim 1 wherein said means to move said patterns comprises a fluid cylinder.

3. The machine recited in claim 2 wherein said machine has a gap between said pattern support means and said head and means is provided to support said patterns on said machine out of said gap where they can be reached by suitable means for removing the same.

4. A molding machine comprising a frame, a sand dispensing mechanism on said frame, a first and a second pattern plate support track horizontally disposed one above the other, a first and a second pattern plate, one on each said pattern plate support track, a sand dispensing head for dispensing sand into a flask, a flask track having rollers thereon for moving said flask under said dispensing head and over said pattern plates on said pattern plate support tracks, a molding head supported on a track and adapted to be moved from a position laterally from said dispensing head to a position between said dispensing head and said flask, and a ram under said dispensing head, said ram having means thereon to selectively move either of said pattern plates into engagement with said flask on said flask track and to move said flask track into molding relation with said molding head whereby sand dispensed by said dispensing head can be compressed in said flask around said pattern plate.

5. A molding machine comprising a frame having a gap intermediate the top and bottom thereof, a sand dispensing means defining the top of said gap, a molding head, means to move said molding head from a position under said sand dispensing means to a position laterally of said sand dispensing means, carrier tracks horizontally disposed one above the other extending generally parallel to each other and from a position laterally of said dispensing means to a position below said dispensing means, a pattern carrier on each said carrier track, means on each said pattern carrier to support a pattern, a flask support above said carrier tracks for moving said flask support over said pattern carriers on said carrier tracks, and a ram below said carrier tracks and said dispensing means, said pattern carriers being selectively movable over said ram and below said dispensing means, said ram being adapted to lift either said pattern support means into engagement with a flask below said dispensing means, said head being movable over said flask, said ram being adapted to move said flask into engagement with said head during molding.

6. The machine recited in claim 5 wherein said pattern carriers have rollers engaging said carrier tracks.

7. A molding machine comprising a frame having a gap intermediate the top and bottom thereof, carrier tracks horizontally disposed one above the other extending generally parallel to each other and from a position laterally of dispensing means to a position below said dispensing means, said dispensing means defining the top of said gap, a pattern carrier on each said carrier track, means on each said pattern carrier to support a pattern, a flask support above said carrier tracks, and a ram below said carrier tracks and said dispensing means, said ram being adapted to lift either of said pattern support means into engagement with a flask below said dispensing means.

8. The machine recited in claim 7 wherein said flask support comprises a conveyor track disposed generally at any convenient angle to said carrier tracks.

9. A molding machine comprising a machine frame, means to support a first pattern and means to support a second pattern on said machine, said first and second pattern support means being horizontally disposed and spaced one above the other, a flask support means on said machine, a flask on said flask support means, means to selectively move said patterns into molding relation with said flask, means on said machine to fill said flask with sand and to compress said sand, and means to move said flask with either said patterns therein to bring said flask and pattern into position to compress sand in said flask around said pattern.

References Cited in the file of this patent

UNITED STATES PATENTS

| | | |
|---|---|---|
| 2,767,445 | Taccone | Oct. 23, 1956 |
| 2,988,789 | Taccone | June 20, 1961 |